(12) United States Patent
Kitsukawa et al.

(10) Patent No.: US 10,690,229 B2
(45) Date of Patent: Jun. 23, 2020

(54) METHOD FOR ATTACHING GEAR DRIVING PART, AND INTERNAL COMBUSTION ENGINE

(71) Applicant: ISUZU MOTORS LIMITED, Shinagawa-ku, Tokyo (JP)

(72) Inventors: Isao Kitsukawa, Fujisawa (JP); Naoki Mizukami, Atsugi (JP); Daisuke Sueoka, Fuchu (JP); Takaya Maeda, Yokohama (JP)

(73) Assignee: ISUZU MOTORS LIMITED, Shinagawa-Ku, Tokyo (JP)

( * ) Notice: Subject to any disclaimer, the term of this patent is extended or adjusted under 35 U.S.C. 154(b) by 153 days.

(21) Appl. No.: 15/775,325

(22) PCT Filed: Nov. 11, 2016

(86) PCT No.: PCT/JP2016/083589
§ 371 (c)(1),
(2) Date: May 10, 2018

(87) PCT Pub. No.: WO2017/082415
PCT Pub. Date: May 18, 2017

(65) Prior Publication Data
US 2018/0320774 A1    Nov. 8, 2018

(30) Foreign Application Priority Data

Nov. 12, 2015    (JP) .................... 2015-222128

(51) Int. Cl.
*F16H 57/023* (2012.01)
*F02M 59/48* (2006.01)
(Continued)

(52) U.S. Cl.
CPC .......... *F16H 57/023* (2013.01); *F02M 59/48* (2013.01); *F16H 57/0025* (2013.01);
(Continued)

(58) Field of Classification Search
CPC .............. F16H 57/023; F16H 57/0025; F16H 2057/0056; F02M 59/48; F01L 1/026
See application file for complete search history.

(56) References Cited

U.S. PATENT DOCUMENTS 4,455,865 A * 6/1984 Davenport ............ F02B 77/087
33/600

FOREIGN PATENT DOCUMENTS

| JP | 62074167 A | 5/1987 |
|---|---|---|
| JP | H09-264400 A | 10/1997 |

(Continued)

OTHER PUBLICATIONS

Extended European Search Report for related EP App No. 16864376.5 dated Jun. 13, 2019, 10 pgs.

(Continued)

*Primary Examiner* — Thomas C Diaz
(74) *Attorney, Agent, or Firm* — Procopio, Cory, Hargreaves & Savitch LLP (57) ABSTRACT

A method for attaching a gear driving part of this disclosure includes a first step of inserting a positioning bolt (23) into a positioning hole (21) of a first gear from a front side, and then screwing the positioning bolt into a screw hole (24) of a fixation-side member to regulate a phase of the first gear with respect to the fixation-side member; and a second step of inserting a portion of the bolt protruding to a front side of the first gear into a hole (22) of the gear case, and meshing the first gear with the second gear while positioning the fixation-side member in a predetermined phase position of the gear case.

6 Claims, 4 Drawing Sheets

(51) Int. Cl.
  *F16H 57/00*   (2012.01)
  *F02M 39/02*   (2006.01)
  *F16H 57/02*   (2012.01)
  *F01L 1/02*    (2006.01)
  *F16H 1/06*    (2006.01)

(52) U.S. Cl.
  CPC .............. *F01L 1/026* (2013.01); *F02M 39/02* (2013.01); *F16H 1/06* (2013.01); *F16H 2057/0056* (2013.01); *F16H 2057/0062* (2013.01); *F16H 2057/02082* (2013.01)

(56) References Cited

FOREIGN PATENT DOCUMENTS

| | | |
|---|---|---|
| JP | H11-062759 A | 3/1999 |
| JP | 2003278619 A | 10/2003 |
| JP | 2009191998 A | 8/2009 |
| JP | 2009-293725 A | 12/2009 |
| JP | 2010-078066 A | 4/2010 |

OTHER PUBLICATIONS

International Search Report and Written Opinion for related PCT application No. PCT/JP2016/083589, dated Jan. 24, 2017; English translation of ISR provided, 7 pages.

\* cited by examiner

METHOD FOR ATTACHING GEAR DRIVING PART, AND INTERNAL COMBUSTION ENGINE

CROSS-REFERENCE TO RELATED APPLICATIONS

This application is a U.S. National Stage entry of PCT Application No: PCT/JP2016/083589 filed Nov. 11, 2016, which claims priority to Japanese Patent Application No. 2015-222128, filed Nov. 12, 2015, the contents of which are incorporated herein by reference.

TECHNICAL FIELD

The disclosure relates to a method for attaching a gear driving part.

BACKGROUND ART

Generally, an internal combustion engine widely has a structure that a component such as a cam shaft and a supply pump, in which a rotation phase is important, is driven by a timing gear. When the timing gear is meshed with a counterpart gear, the phases of both gears are aligned in a timing mark (alignment mark) while both gears are meshed with each other.

CITATION LIST

Patent Literature

[Patent Literature 1]: Japanese Unexamined Patent Application Publication No. H9-264400

SUMMARY

Technical Problem

On the other hand, when the component is replaced in a market place or the like for the layout of the internal combustion engine, the phase check cannot be performed by the timing mark in some case. In this case, a method is performed which aligns the phase using a dedicated special tool. However, the special tool becomes essential, which causes a defect that a troublesome work occurs and high cost is required for the special tool.

In this regard, this disclosure provides a method for attaching a gear driving part and an internal combustion engine in which a phase can be aligned without using a special tool.

Solution to Problem

According to one aspect of this disclosure, in a method for attaching a gear driving part, a first gear provided on a front side of a fixation-side member of a gear driving part in a rotatable manner is meshed with a second gear in which a portion of the tooth is exposed from an opening part of a gear case while being phase-aligned with the second gear, and then the fixation-side member is fixed in the gear case. The method for attaching the gear driving part includes:

a first step of inserting a positioning bolt into a positioning hole of the first gear from a front side and screwing the positioning bolt into a screw hole of the fixation-side member to regulate a phase of the first gear with respect to the fixation-side member; and a second step of inserting a portion of the bolt protruding to a front side of the first gear into a hole of the gear case and meshing the first gear with the second gear while positioning the fixation-side member in a predetermined phase position of the gear case.

In the method for attaching the gear driving part, the bolt may be a general-purpose bolt.

The attaching method for attaching the gear driving part may further include:

a third step of fixing the fixation-side member in the gear case;

a fourth step of extracting the bolt from the hole of the gear case; and a fifth step of closing the hole of the gear case.

In the method for attaching the gear driving part, the gear driving part may be a supply pump which force-feeds a fuel.

According to one aspect of this disclosure, an internal combustion engine includes: a gear driving part which has a fixation-side member; a first gear which is provided on a front side of the fixation-side member in a rotatable manner; and a gear case in which the fixation-side member is fixed. The fixation-side member has a screw hole, the first gear has a positioning hole, the gear case has a gear case hole, and in a predetermined phase position, the screw hole, the positioning hole, and the gear case hole are overlapped with each other in an axial direction.

Advantageous Effects

According to this disclosure, the phase can be aligned without using the special tool.

DESCRIPTION OF EMBODIMENTS

Hereinafter, the embodiment of this disclosure will be described with reference to the accompanying drawings.

Figure 1:
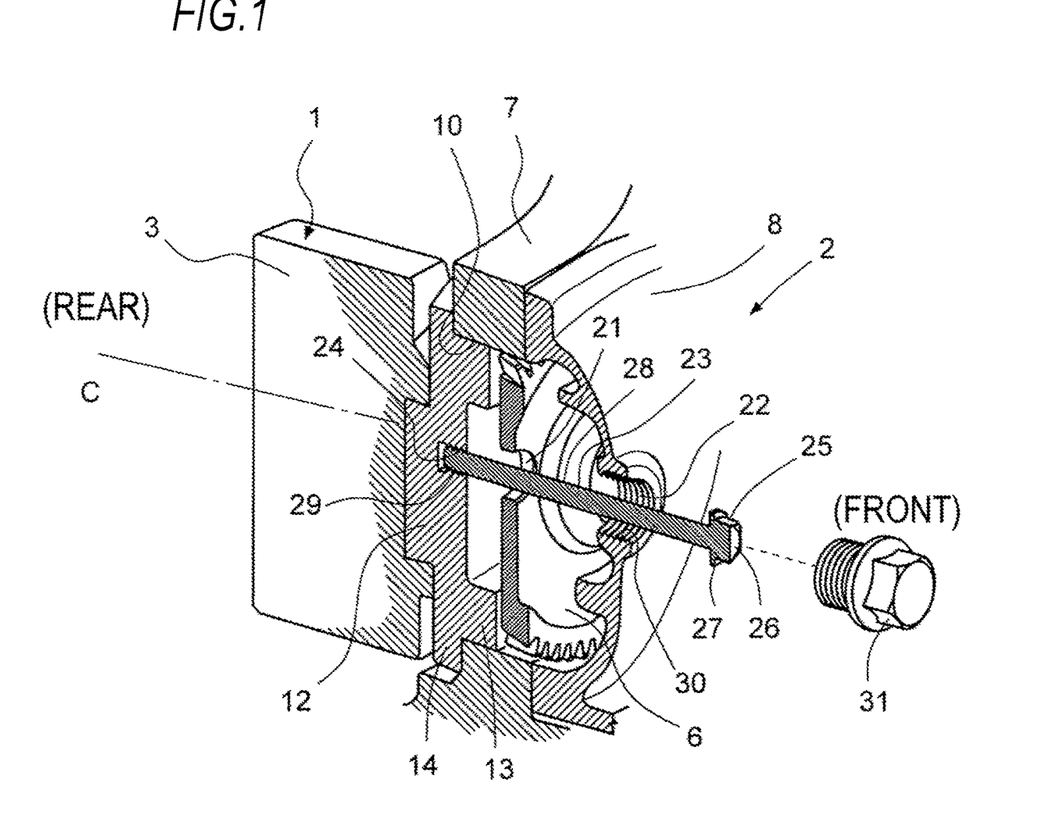
FIG. 1 is a perspective view schematically illustrating an attaching structure of a gear driving part.

FIG. 1 is a perspective view schematically illustrating an attaching structure of a gear driving part according to this embodiment. An internal combustion engine in this embodiment is a diesel engine mounted with a vehicle such as a truck, but is not particularly limited to the type, the purpose, or the like of the vehicle and the internal combustion engine.

An internal combustion engine (engine) 100 has a supply pump 1 as a gear driving part driven by a gear and a gear case 2 which contains a gear for driving the supply pump 1. The supply pump 1 is a high pressure fuel pump which force-feeds the fuel to the common rail of the engine. The supply pump 1 includes a pump body 3, a pump shaft 4 (see FIG. 2) which is provided in the pump body 3 in a rotatable manner, and a pump gear 6 as a first gear which is coaxially attached in the pump shaft 4 and is fixed in a rotational direction using a fixing unit such as a key 5. The pump gear 6 serves as a timing gear which is synchronously rotated with the crank shaft of the engine.

Hereinafter, for the sake of convenience, a central shaft C of the pump shaft 4 is simply referred to as a shaft, a direction of the central shaft C is simply referred to as an axial direction, the right side in the axial direction in the drawings is referred to "front", and the left side in the drawings is referred to "rear". The axial direction is parallel to the axial direction of the crank shaft. Herein, the front and rear direction is opposite to the front and rear direction of the engine and the vehicle, but may be the same. Unless otherwise noted, a shaft rotation, a radial direction, a circumferential direction, a phase indicate the shaft rotation about the central shaft C, a radial direction, a circumferential direction, and a phase.

Figure 2:
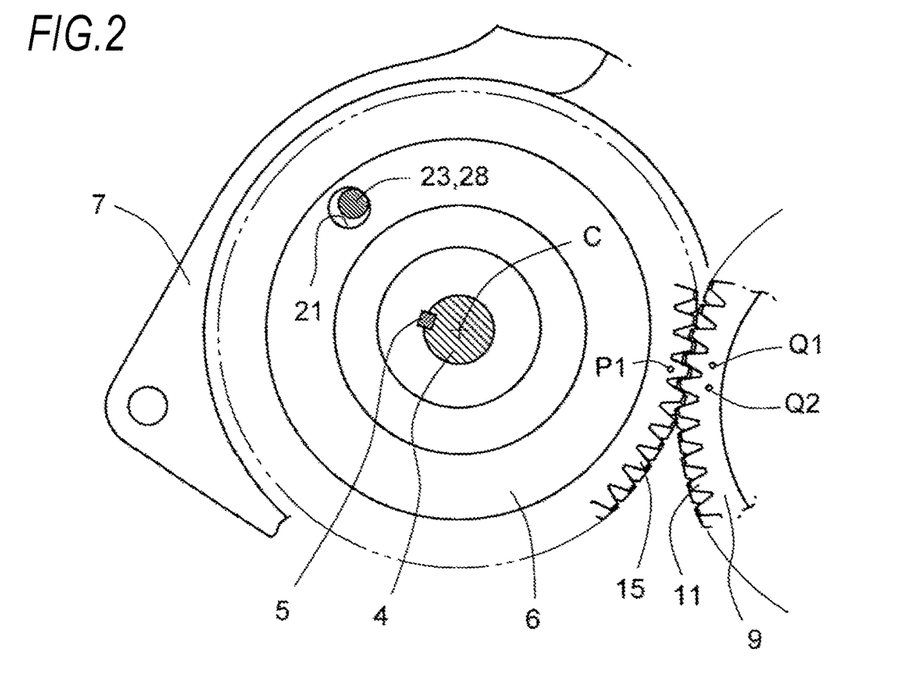
FIG. 2 is a partial front view when viewed from an axial front side.

The gear case 2 includes a gear case body 7 which is provided to be integrated with the cylinder block of the engine, and a case cover 8 which is attached in the gear case body 7 using a bolt (not illustrated). FIG. 2 is a partial front view illustrating a state where the case cover 8 is detached when viewed from an axial front side.

A pump gear 6 and one or plural gears for driving the pump gear 6 are provided in the gear case 2. In this embodiment, a crank gear (not illustrated) fixed in the crank shaft and an idle gear 9 (see FIG. 2) which is phase-aligned to be meshed with the crank gear and the pump gear 6 are provided. A driving force is transmitted in order of the crank gear, the idle gear 9, and the pump gear 6.

The idle gear 9 is arranged such that when the supply pump 1 is detached from the gear case 2, a portion from an opening part 10 of the gear case body 7 to a portion of the tooth 11 of the idle gear 9 is exposed to the rear side. The opening part 10 has a size and a shape that enable the pump gear 6 to pass therethrough in the axial direction. The idle gear 9 forms a second gear with which the pump gear 6 is phase-aligned to be meshed. In this embodiment, the pump gear 6, the idle gear 9, and the crank gear are configured by a helical gear.

The supply pump 1 has a pump bracket 12 which is fixed in a front surface part of the pump body 3 by a bolt (not illustrated) or the like. The pump body 3 and the pump bracket 12 form substantially single component, and form a fixation-side member of the supply pump 1. The pump shaft 4 protrudes forward from the pump bracket 12, and the pump gear 6 is attached in the protrusion portion of the pump shaft 4. Therefore, the pump gear 6 is provided on the front side of the fixation-side member in a rotatable manner.

The pump bracket 12 has a fitting part 13 which is fitted and inserted (spigot-fitted) in the opening part 10 from the rear side toward the front side in the axial direction, and a step part 14 which is positioned on the rear side of the fitting part 13 to protrude outward in the radial direction and regulates the inserting amount of the fitting part 13. The pump bracket 12 is attached only in a predetermined phase position of the shaft rotation with respect to the gear case body 7 or the opening part 10. That is, in this embodiment, a positioning unit is provided which determines the phase position where the pump bracket 12 is attached with respect to the gear case body 7. In the case of this embodiment, a plurality of protrusion members (not illustrated) (for example, a stud bolt) protrude from the rear surface part of the gear case body 7 and are fitted into a plurality of fitting holes of the step part 14, so that the pump bracket 12 is positioned with respect to the gear case body 7 in a phase direction. Such a positioning unit may have an arbitrary configuration.

The pump bracket 12 is fitted and positioned in the opening part 10 of the gear case body 7, and then is fixed in the gear case body 7 using the bolt (not illustrated). In this fixed state, the step part 14 is closed in a state where a gap between the fitting part 13 and the opening part 10 is sealed.

When the supply pump 1 is attached as above, in an engine production base such as a factory, the case cover 8 is detached, and the timing marks (alignment mark) P1, Q1, and Q2 provided in the teeth 15 and 11 of the pump gear 6 and the idle gear 9 are visible from the front side. Thus, the worker meshes the pump gear 6 with the idle gear 9 such that the timing mark P1 of the pump gear 6 attached in the supply pump 1 in advance enters between two timing marks Q1 and Q2 of the idle gear 9. Further, simultaneously, the fitting part 13 is fitted and inserted in the opening part 10 while being phase-aligned therewith. That is, the supply pump 1 is attached in the gear case 2 while the phase is aligned between the pump gear 6 and the idle gear 9 and between the pump bracket 12 and the gear case body 7.

In the attached state, the phase of the supply pump 1 is a proper phase which is preset with respect to the phase of the crank shaft. Thus, the supply pump 1 is rotatable synchronously with the crank shaft at a preset proper timing. Incidentally, the supply pump 1 rotates synchronously with the crank shaft at a speed ratio of 1:1 during the rotation.

Incidentally, in some cases, after the vehicle is shipped to the market place, the supply pump 1 is replaced. At that time, in order to detach the case cover 8, the engine is necessarily unloaded from the vehicle, which is complicated. Thus, the supply pump 1 is desirably replaced in a state where the engine is mounted in the vehicle and the case cover 8 is attached.

There is no particular problem when the supply pump 1 is detached during the replacement of the supply pump 1. A problem occurs when the supply pump 1 is attached. In a state where the engine is mounted in the vehicle and the case cover 8 is attached, the supply pump 1 is at a relatively complicated position, the access to the opening part 10 is difficult, and the timing marks Q1 and Q2 of the tooth 11 of the idle gear 9 exposed from the opening part 10 are considerably hard to see. Thus, it is considerably difficult that the pump gear 6 is meshed with the idle gear 9 while being phase-aligned therewith. Further, in single body of the supply pump 1, the pump gear 6 is freely rotated with respect to the pump body 3. Therefore, under such a difficult circumstance, it becomes a challenge that the pump gear 6 is accurately phase-aligned in the idle gear 9 at the time of attachment of the supply pump 1 and is meshed simultaneously.

Conventionally, in that case, a dedicated special tool is used to perform the phase-alignment and meshing. However, in the conventional method, the special tool is essential, so that a troublesome work occurs and high cost is required for the special tool.

In this regard, in this embodiment, an attaching method for the supply pump 1 is provided which performs the phase-alignment and meshing without using the special tool. Accordingly, the supply pump 1 can be attached easily and at low cost.

FIGS. 1 and 2 illustrate an aspect of the supply pump 1 during attachment. As illustrated, a gear hole 21 as a positioning hole is provided in the pump gear 6, and a cover hole 22 which is a hole of the gear case 2 is provided in the case cover 8. Further, the positioning bolt 23 is inserted into the holes 21 and 22. The bolt 23 is screwed and attached in a screw hole 24 provided in the front surface part of the pump bracket 12. The bolt 23 in the attached state extends in a direction of the central shaft C of the pump shaft 4. That is, the central shaft of the bolt 23 is parallel to the central shaft C of the pump shaft 4.

The gear hole 21 is arranged in a position where a predetermined phase difference is provided with respect to the timing mark P1 of the pump gear 6. The cover hole 22 is arranged such that when the pump bracket 12 is assembled in a proper position of the gear case body 7, a head part 25 of the bolt 23 can pass therethrough.

The bolt 23 includes the head part 25 which integrally has a hexagon head 26 and a washer 27, a shaft part 28 which extends from the head part 25 and has a constant diameter smaller than the head part 25, and a male screw part 29 which is formed in at least the tip part of the shaft part 28 to be screwed in the screw hole 24. The bolt 23 has a relatively long length such that the head part 25 and a portion of the shaft part 28 protrude to the front side from the cover hole 22 in the attached state as illustrated in the drawings.

Particularly, in this embodiment, the bolt 23 is configured by a general-purpose bolt. Accordingly, the bolt 23 can be obtained easily. Thus, compared to a case where a dedicated special tool is used, a complexity can be reduced prominently, and the cost also can be reduced sharply.

The cover hole 22 has an inner diameter larger than the maximum outer diameter (the outer diameter of the washer 27) of the bolt 23 such that the head part 25 of the bolt 23 can pass therethrough.

The gear hole 21 is a diameter slightly larger than the shaft part 28 of the bolt 23. If the rotation of the pump gear 6 is regulated additionally, in the attached state of the bolt 23, the pump gear 6 is rotatable freely with respect to the pump body 3 in a clearance range of the gear hole 21 and the shaft part 28.

The cover hole 22 and the bolt 23 are used for a service necessary only when the supply pump 1 is attached. For this reason, after the supply pump 1 is completely attached, the bolt 23 is detached, and the cover hole 22 is closed. For this reason, a female screw 30 is formed in the inner circumferential surface of the cover hole 22. A closing bolt 31 is screwed thereto, and the cover hole 22 is closed in a sealed state. Furthermore, the closing method for the cover hole 22 is not limited thereto.

Next, the detailed description will be given about the replacing method and the attaching method for the supply pump 1.

First, the previous supply pump 1 is detached from the gear case 2. At that time, the bolt which fixes the pump bracket 12 in the gear case body 7 is detached, and the supply pump 1 may be pulled out to the rear side together with the pump gear 6.

Next, the procedure shifts to an attaching work of a new supply pump 1. At that time, first, the crank shaft is positioned in a predetermined reference phase position, and the idle gear 9 is arranged in the reference phase position illustrated in FIG. 2 corresponding to the reference phase position thereof. For example, the reference phase position of the crank shaft is such a phase position that #1 cylinder is positioned at a top dead point. Further, the closing bolt 31 is detached so that the cover hole 22 becomes in an open state.

Next, the shaft part 28 of the bolt 23 is inserted from the front side into the gear hole 21 of the pump gear 6 attached in the new supply pump 1 in advance. Next, the male screw part 29 of the bolt 23 is screwed into the screw hole 24 of the pump bracket 12, and the bolt 23 is temporarily attached in the supply pump 1. Accordingly, the rotation phase of the pump gear 6 with respect to the pump body 3 and the pump bracket 12 is regulated.

Next, in this state, the fitting part 13 of the pump bracket 12 is fitted and inserted toward the front side from the rear side in the opening part 10. At that time, the head part 25 of the bolt 23 protruding to the front side of the pump gear 6 is inserted into the cover hole 22, and the pump gear 6 is meshed with the idle gear 9 while the pump bracket 12 is positioned in a predetermined phase position of the gear case body 7. Accordingly, spontaneously, as illustrated in FIG. 2, the pump gear 6 is accurately phase-aligned with the idle gear 9, and is meshed simultaneously.

That is, the phase of the pump gear 6 with respect to the pump bracket 12 is regulated by the bolt 23. Since the pump bracket 12 is accurately phase-aligned with the gear case body 7 by the above-described positioning unit, the pump gear 6 is automatically phase-aligned with the idle gear 9 at the same time when the fitting part 13 is fitted and inserted.

Thereafter, the pump bracket 12 is fixed in the gear case body 7 by the bolt. Incidentally, a temporal fixation may be performed at that time, and a main fixation may be fixed later. Herein, the fixation includes the temporal fixation.

Next, the head part 25 of the bolt 23 protruding forward from the cover hole 22 is turned by hand, and the bolt 23 is taken off from the screw hole 24. Next, the bolt is pulled out to the front side to be extracted from the gear hole 21 and the cover hole 22. Since the bolt 23 protrudes from the cover hole 22, the bolt 23 can be detached easily and reliably.

Finally, the closing bolt 31 is attached in the cover hole 22 to close the cover hole 22. In this manner, the attaching work of the supply pump 1 is completed.

Figure 3:
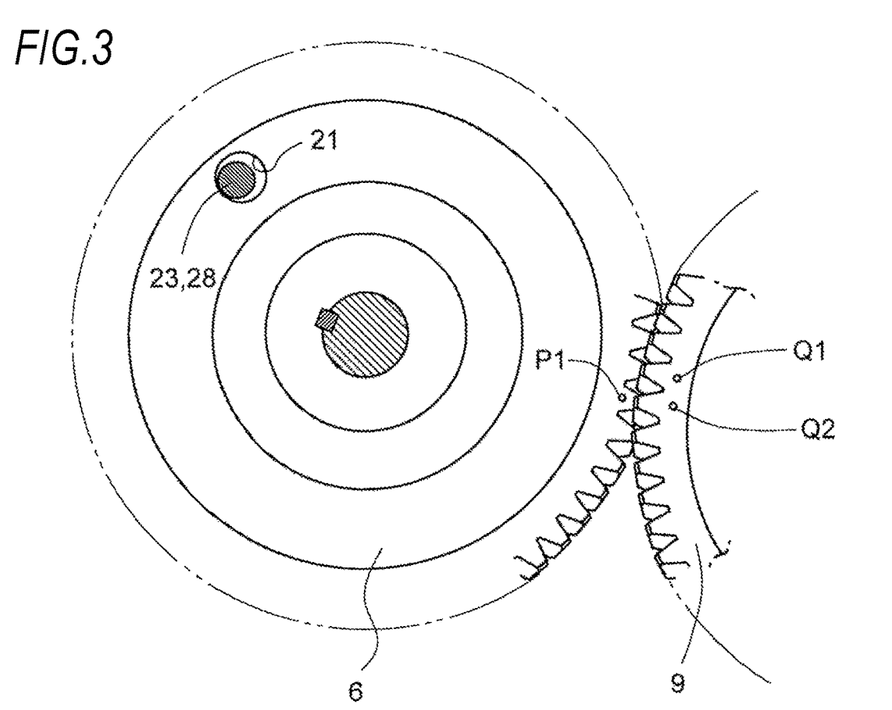
FIG. 3 is a front view schematically illustrating a phase position of a pump gear before meshing a gear.
Figure 4:
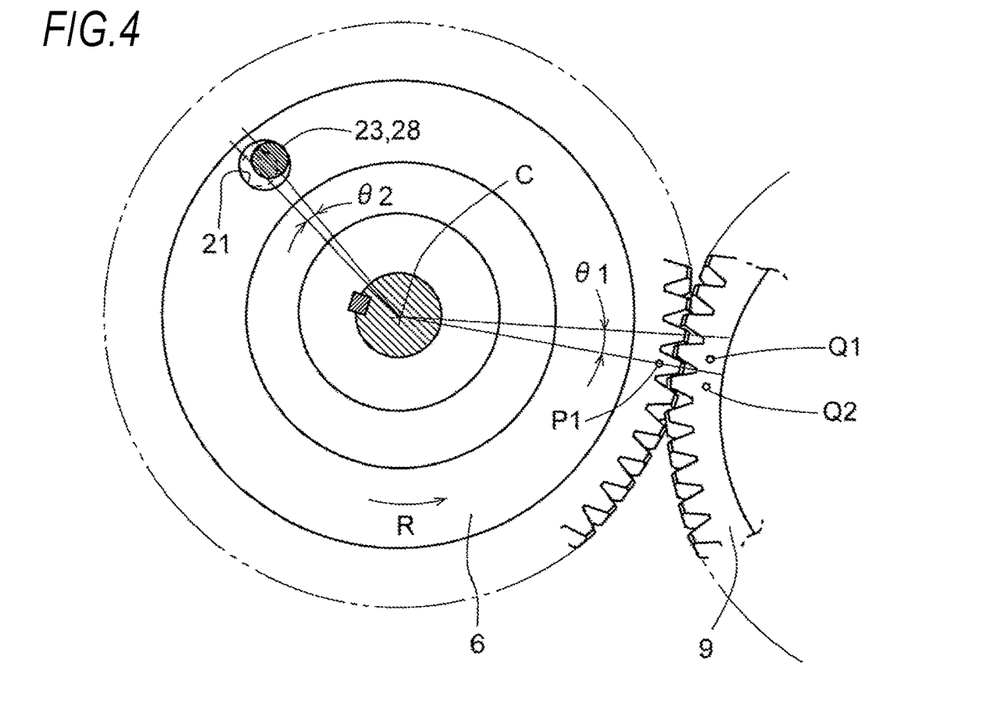
FIG. 4 is a front view schematically illustrating the phase position of the pump gear after meshing the gear.

FIG. 3 illustrates the phase position of the pump gear 6 before meshing the gear in a state where the pump bracket 12 is in an initial period of fitting. FIG. 4 illustrates the phase position of the pump gear 6 after meshing the gear in a state where the pump bracket 12 is in an ending period of fitting. Incidentally, the phase position of the idle gear 9 is constant. As described above, the pump gear 6 and the idle gear 9 are a helical gear. Thus, throughout meshing, the pump gear 6 rotates in the rotational direction R indicated by an arrow in FIG. 4.

At that time, a rotate allowable angle θ2 of the pump gear 6 in the attached state of the bolt 23 is smaller than an angle θ1 between teeth of the pump gear 6. Thus, although the rotation occurs during meshing, the pump gear 6 can be accurately phase-aligned with the idle gear 9 without the phase deviation (tooth deviation). In other words, the hole diameter of the gear hole 21, or the clearance of the gear hole 21 and the bolt shaft part 28 is set such that the phase-alignment is performed accurately.

Figure 5:
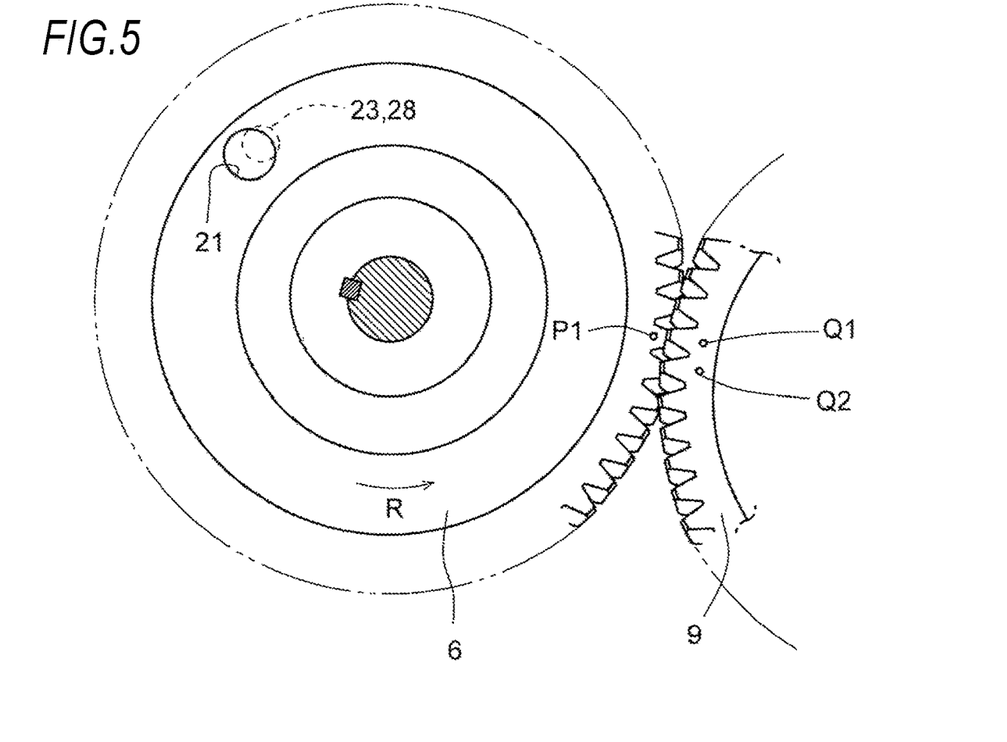
FIG. 5 is a front view schematically illustrating a state where the pump gear is deviated before meshing the gear.

Reversely, FIG. 5 illustrates a virtual situation at the time of fitting the pump bracket 12 in a state where the pump gear 6 is deviated by one tooth with respect to the idle gear 9 in the rotational direction R before meshing the gear. At that time, as illustrated, the bolt shaft part 28 interferes with the periphery part of the gear hole 21 (the bolt shaft part 28 does not enter the gear hole 21), and thus such a situation cannot occur in this embodiment.

Figure 6:
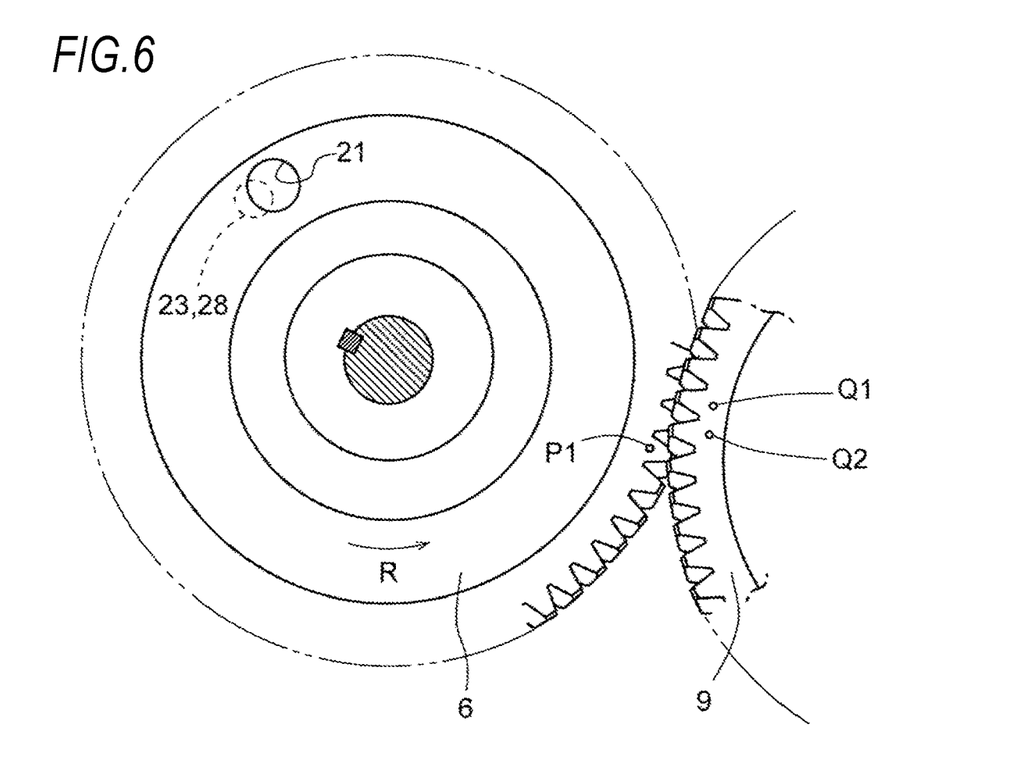
FIG. 6 is a front view schematically illustrating a state where the pump gear is deviated before meshing the gear.

Similarly, FIG. 6 illustrates a virtual situation at the time of fitting the pump bracket 12 in a state where the pump gear 6 is deviated by one tooth with respect to the idle gear 9 in the opposite direction to the rotational direction R before meshing the gear. Also at that time, as illustrated, the bolt shaft part 28 interferes with the periphery part of the gear hole 21, and thus such a situation cannot occur in this embodiment. In this embodiment as above, it can be suppressed reliably that the pump gear 6 is meshed with the idle gear 9 in the phase deviation state. In other words, the hole diameter of the gear hole 21, or the clearance of the gear hole 21 and the bolt shaft part 28 is optimally set such that the meshing does not occur in such a phase deviation state.

As described above, in this embodiment, the pump gear 6 can be meshed with the idle gear 9 while being phase-aligned therewith without using a dedicated special tool, and thus the supply pump 1 can be attached easily and at low cost.

Without unloading the engine from the vehicle, the supply pump 1 can be attached in a state where the case cover 8 is attached. Thus, the replacing work and the attaching work of the supply pump 1 can be facilitated prominently.

Since the positioning bolt 23 is configured by a general-purpose bolt, the bolt 23 can be obtained easily. Thus, compared to a case where a dedicated special tool is used, the complexity can be reduced prominently, and the cost also can be reduced sharply.

The detailed description has been given about the method for attaching the gear driving part, but this disclosure discloses the internal combustion engine from the similar viewpoint. That is, the internal combustion engine of the application includes a gear driving part which has a fixation-side member, a first gear which is provided on a front side of the fixation-side member in a rotatable manner, and a gear case in which the fixation-side member is fixed. The fixation-side member has a screw hole, the first gear has a positioning hole, the gear case has a gear case hole, and in a predetermined phase position, the screw hole, the positioning hole, and the gear case hole are overlapped with each other in an axial direction.

Hereinbefore, the embodiment of this disclosure has been described in detail, but this disclosure can be also applied to another embodiment.

(1) For example, the positioning bolt may not be a general-purpose bolt, and may be a shaft-shaped bolt which has a constant diameter without a head part. Even in such a case, compared to a case where a dedicated special tool is used, the complexity can be reduced prominently, and the cost can be reduced sharply.

(2) The gear driving part is not limited to the supply pump, and but may be an arbitrary component having a gear-driving type or an engine auxiliary device. The gear driving part of this embodiment is a driven component of which the gear (pump gear 6) is rotated and driven by a counterpart gear (idle gear 9) meshed therewith, but reversely, may be a driving component which rotates and drives the counterpart gear by the own gear.

The embodiment of this disclosure is not limited to the above-described embodiment, but this disclosure includes all modifications and applications encompassed in the concept in this disclosure defined in claims. Therefore, this disclosure should not be interpreted in a limiting manner and can be applied to any other technology within the scope in the concept in this disclosure.

The present application is based on Japanese Patent Application (No. 2015-222128) filed on Nov. 12, 2015. The contents thereof are incorporated hereinto by reference.

INDUSTRIAL APPLICABILITY

According to the method for attaching the gear driving part and the internal combustion engine of this disclosure, the phase can be aligned without using the special tool.

REFERENCE SIGNS LIST

1: supply pump
2: gear case
3: pump body
6: pump gear
9: idle gear
10: opening part
12: pump bracket
21: gear hole
22: cover hole
23: bolt
24: screw hole
25: head part
100: internal combustion engine (engine)

The invention claimed is:

1. A method for attaching a gear driving part in which a first gear provided on a front side of a fixation-side member of a gear driving part in a rotatable manner is meshed with a second gear in which a portion of the tooth is exposed from an opening part of a gear case while being phase-aligned with the second gear, and then the fixation-side member is fixed in the gear case, the method comprising:
    a first step of inserting a positioning bolt into a positioning hole of the first gear from a front side and screwing the positioning bolt into a screw hole of the fixation-side member to regulate a phase of the first gear with respect to the fixation-side member; and
    a second step of inserting a portion of the bolt protruding to a front side of the first gear into a hole of the gear case and meshing the first gear with the second gear while positioning the fixation-side member in a predetermined phase position of the gear case.

2. The method for attaching the gear driving part according to claim 1, wherein
    the bolt is a general-purpose bolt.

3. The method for attaching the gear driving part according to claim 1, further comprising:
    a third step of fixing the fixation-side member in the gear case;
    a fourth step of extracting the bolt from the hole of the gear case; and
    a fifth step of closing the hole of the gear case.

4. The method for attaching the gear driving part according to claim 2, further comprising:
    a third step of fixing the fixation-side member in the gear case;
    a fourth step of extracting the bolt from the hole of the gear case; and
    a fifth step of closing the hole of the gear case.

5. The method for attaching the gear driving part of claim 1, wherein
    the gear driving part is a supply pump which force-feeds a Biel.

6. An internal combustion engine comprising:
    a gear driving part which has a fixation-side member;
    a first gear which is provided on a front side of the fixation-side member in a rotatable manner; and
    a gear case in which the fixation-side member is fixed, wherein
    the gear case includes a gear case body and a gear cover attached to the gear case body,
    the fixation-side member has a screw hole,
    the first gear has a positioning through hole,
    the gear cover has a gear-cover through hole, and
    in a predetermined phase position, the screw hole, the positioning through hole, and the gear-cover through hole are overlapped with each other in an axial direction of the gear driving part,
    in the predetermined phase position, the positioning through hole of the first gear is arranged between the screw hole of the fixation-side member and the gear-cover through hole of the gear cover.

* * * * *